United States Patent [19]

Pierce

[11] Patent Number: 4,978,328
[45] Date of Patent: Dec. 18, 1990

[54] AUTOMATIC TRANSAXLE ASSEMBLY FOR AN AUTOMOTIVE VEHICLE DRIVELINE

[75] Inventor: Stanley L. Pierce, Northville, Mich.

[73] Assignee: Ford Motor Company, Dearborn, Mich.

[21] Appl. No.: 412,232

[22] Filed: Sep. 25, 1989

[51] Int. Cl.$^5$ .............................................. F16H 37/08
[52] U.S. Cl. ....................................... 475/66; 475/71; 475/205
[58] Field of Search ...................... 475/59, 66, 71, 205, 475/206, 207

[56] References Cited

U.S. PATENT DOCUMENTS

| | | | |
|---|---|---|---|
| 3,339,431 | 9/1967 | Croswhite et al. | 475/56 |
| 4,056,988 | 11/1977 | Kubo et al. | 475/66 |
| 4,509,389 | 4/1985 | Vahratian et al. | 475/66 |
| 4,607,541 | 8/1986 | Miura et al. | 475/148 |
| 4,624,154 | 11/1986 | Kraft et al. | 475/71 X |
| 4,719,985 | 1/1988 | Zaiser | 475/71 X |
| 4,836,049 | 6/1989 | Moan | 475/205 X |

OTHER PUBLICATIONS

Ward's Engine Update, Jul. 15, 1989, p. 6.

Primary Examiner—Dirk Wright
Attorney, Agent, or Firm—Donald J. Harrington; Frank G. McKenzie; Keith L. Zerschling

[57] ABSTRACT

A transaxle assembly for use in a vehicle driveline comprising a hydrokinetic torque converter (12, 14, 16) located on an engine axis, planetary gearing (178, 180) located on a space parallel axis including means (242, 248, 250) for transferring the output torque of the planetary gearing to each of two axle shafts situated on an axis common to the axis of the planetary gearing and a multiple ratio torque transfer drive (52, 80, 90, 112, 114) between the turbine of the hydrokinetic torque converter and the torque input element of the planetary gearing, the transfer drive comprising a pair of differential diameter external tooth gears that are independently rotated and clutch means (96, 98) for selectively activating and deactivating each of two torque flow paths between the differential diameter gears whereby the speed-torque characteristics of the engine can be precisely matched with the ratio range available for the planetary gearing and the hydrokinetic torque converter to effect optimum powertrain performance, fuel economy and gradeability.

10 Claims, 9 Drawing Sheets

| Range | Gear | Transaxle Friction Elements | | | | | | | Drive | | | Coast | | | Ratio | Step |
|---|---|---|---|---|---|---|---|---|---|---|---|---|---|---|---|---|
| | | C1 | C2 | C3 | C4 | C5 | B1 | B2 | OWC1 | OWC2 | OWC3 | OWC1 | OWC2 | OWC3 | | |
| ↑ D ↓ Ⓓ | 1 | X | | | | | | X | X | | | O/R | | O/R | 3.357 | 1.796 |
| | 2 | X | X | | | | | X | O/R | X | | O/R | | O/R | 1.869 | 1.565 |
| | 3 | X | X | | | X | | | O/R | X | O/R | O/R | | O/R | 1.195 | 1.543 |
| | 4 | X | X | X | | X | | | | | O/R | | X | O/R | 0.775 | 1.442 |
| | 5 | X | X | X | | X | X | | | | O/R | | | O/R | 0.598 | |
| | ML | X | X | | | | | X | X | | X | | X | O/R | 2.148 | |
| | R | X | X | | X | | | | X | X | X | O/R | X | O/R | 2.741 | |
| | 3L | X | X | | | X | | | | | X | | | O/R | | |
| | 4L | X | X | X | | X | | | | | X | | | O/R | | |

| Gear | Defining Equation |
|---|---|
| 1st | $\left(1 + \dfrac{S2}{R2} + \dfrac{R1}{R2}\right)\left(\dfrac{G3}{G1}\right)$ |
| 2nd | $\left(1 + \dfrac{S2}{R2}\right)\left(\dfrac{G3}{G1}\right)$ |
| 3rd | $\left(1 + \dfrac{S2}{R2}\right)\left(\dfrac{G5}{G4}\right)$ |
| 4th | $\left(\dfrac{G2}{G1}\right)\left(\dfrac{G5}{G4}\right)$ |
| 5th | $\left(\dfrac{R1}{R1+S1}\right)\left(\dfrac{G2}{G1}\right)\left(\dfrac{G5}{G4}\right)$ |
| ML | $\left(1 + \dfrac{S2}{R2} + \dfrac{R1}{R2}\right)\left(\dfrac{G2}{G1}\right)\left(\dfrac{G5}{G4}\right)$ |
| 3L | $\dfrac{G3}{G1}$ |
| 4L | $\left(\dfrac{R1}{R1+S1}\right)\dfrac{G3}{G1}$ |

$$Rev = \left(\dfrac{R1}{S1}\right)\left(\dfrac{G3}{G1}\right)$$

$$F.D. = 1 + \dfrac{R3}{S3}$$

FIG. 6.

| Gear | Range | CL1 | CL2 | CL3 | CL4 | B1 | B2 | OWC1 | OWC2 | Planetary Gear Ratio | 5 – Speed Gear Ratio | Step |
|---|---|---|---|---|---|---|---|---|---|---|---|---|
| ML | HI |  |  | X | X |  | X | O/R | X | 2.422 | 1.695 |  |
| 1 | LOW |  |  |  | X | X |  | X | X | 2.422 | 2.664 |  |
| 2 | LOW |  | X |  | X | X |  | X | O/R | 1.422 | 1.564 | 41.29% |
| 3 | LOW |  | X | X | X |  |  | X | O/R | 1.000 | 1.000 | 36.38% |
| 4 | HI |  | X | X |  | X |  | O/R | O/R | 1.000 | .700 | 29.65% |
| 5 | HI |  | X |  |  |  |  | O/R | O/R | .703 | .492 | 29.65% |
| N |  |  |  |  |  |  |  |  |  |  |  |  |
| R | LOW | X |  |  |  |  | X | X |  | 2.368 | 2.605 |  |

LOW Range = G1/G = 1.1
HI Range = P1/G * G2/P2 = .7
Final Drive Ratio = 4.00:1

AUTOMATIC TRANSAXLE ASSEMBLY FOR AN AUTOMOTIVE VEHICLE DRIVELINE

FIELD OF THE INVENTION

My invention relates generally to automotive vehicle drivelines having a transaxle arrangement for use with an internal combustion engine.

BACKGROUND OF THE INVENTION

A transaxle and an engine for an automotive vehicle usually are assembled in a common powertrain package with the axis of the engine crankshaft parallel to the transaxle output shaft axis. The crankshaft axis and the transaxle output shaft axis are transversely mounted in the vehicle in a forward powertrain compartment. The output shaft drives the steerable front wheels of the vehicle through universal joints and half shaft assemblies. A typical example of a driveline of this kind may be seen by referring to U.S. Pat. No. 4,509,389, which is assigned to the assignee of this invention.

Other examples of transaxles of this kind may be seen by referring to U.S. Pat. No. 4,607,541 and to my U.S. Pat. No. 4,418,585. Each of these prior art patents includes a pair of simple planetary gear units arranged to define a compound torque flow path with selectively engageable clutches and brakes for establishing the driving speed ratios. The planetary gearing of U.S. Pat. Nos. 4,418,585 and 4,509,389, like the planetary gear arrangement of the present invention, is disposed with its axis common to the output shaft axis. The multiple ratio planetary gear units of reference U.S. Pat. No. 4,607,541, on the other hand, are disposed on an axis parallel to the output shaft axis. That parallel axis is coincident with the hydrokinetic torque converter axis situated between the torque input elements of the gearing and the engine.

Each of these prior art reference patents describes a transaxle capable of achieving four forward driving speed ratios and a single reverse speed ratio. Each of them also describes a hydrokinetic torque converter. Each torque converter has a lockup clutch for effecting a mechanical driving connection between the impeller and the turbine of the converter.

Because of the constraints that are imposed on an engine powered vehicle driveline by the limited number of ratios available in the planetary gearing, it is not possible with such four speed ratio transaxles to achieve the full performance potential and the full potential for economy gains that would be available if five or more ratios in the driving range were to be available.

I am aware of recent attempts to modify existing four speed ratio transmissions to achieve five driving ratios in an automotive vehicle driveline, but these attempts usually involve the use of auxiliary gearing at the torque output portion of the basic four speed ratio gearing. They also include separate clutches and brakes for controlling the driving ratio of the auxiliary transmission. An example of a driveline of this kind may be seen by referring to Ward's Engine Update, an automotive news magazine, dated July 15, 1989, Page 6.

Such modifications to normal four speed ratio gear systems have only limited potential for improving efficiency and performance because of the limitations on the ratio spread available by the use of the auxiliary planetary gearing. Those limitations are imposed by the geometry of the auxiliary planetary gearing itself since the change in ratio range that is available by reason of the addition of the auxiliary gear unit is limited by the available range of pitch diameter ratios of the internal gear and the external gear of the auxiliary planetary gear system. Further, the use of such an auxiliary gear system adds to the overall length of the transmission, which makes it difficult to assemble the transmission in a compact engine and transmission compartment. In most vehicle applications, especially front wheel drive vehicles, styling considerations impose limitations on available space for the powertrain package.

Aside from such space limitations, the use of the auxiliary gear unit adds considerable weight to the transmission and adds to the complexity in manufacture and assembly as well as cost because of the additional elements that are required.

BRIEF DESCRIPTION OF THE INVENTION

My invention has as its objective the provision of five or more forward driving speed ratios in a driveline of the kind described in the preceding paragraphs without the imposition of the added complexity, weight, and cost of conventional auxiliary gear units in combination with a basic four speed planetary gear system. It is also my objective to provide a transmission having five or more speed ratios in a driveline of the kind above-described wherein the ratio spread of the forward driving ratios can be tailored precisely to match the particular speed-torque characteristics of the internal combustion engine with which the transaxle is used.

My improved automatic transaxle has features that are common to the four speed automatic transaxle described in U.S. Pat. No. 4,509,389. I have achieved the full performance and efficiency potential of a five speed automatic transaxle by appropriately modifying the basic structure of the transmission of U.S. Pat. No. 4,509,389 without significantly increasing complexity in manufacture, assembly and cost, and without exceeding the dimensional constraints.

The transmission of U.S. Pat. No. 4,509,389 includes a hydrokinetic torque converter located on the axis of the crankshaft of the internal combustion engine. Multiple ratio planetary gearing is mounted on a spaced, parallel axis which corresponds to the axis of the torque output shaft. Turbine torque of the torque converter is delivered through a turbine shaft and through a drive sprocket mounted on the axis of the torque converter to a driven sprocket mounted on the axis of the output shaft. The driving and driven sprockets are driveably connected by a torque transfer chain.

The driven sprocket is connected through selectively engageable clutches to the torque input elements of multiple ratio planetary gearing. The torque converter and the gearing are located in a common transaxle housing together with a transmission control valve body and a final drive gear arrangement, the latter being located at the torque output end of the multiple ratio gearing.

The final drive gearing includes a planetary reduction gear and a differential gear mechanism, the torque output side gears of the differential gearing being connected to the vehicle traction wheels through half shaft assemblies. One side gear is connected to a first universal joint driving connection for one half shaft and the other side gear is connected by a companion universal joint driving connection to the other half shaft. The latter connection is established by a torque output shaft disposed concentrically with respect to the planetary gearing and the clutches and brakes for the multiple ratio gearing.

The space that normally would be occupied by the torque transfer chain in a transmission of the kind disclosed in U.S. Pat. No. 4,509,389 is occupied by a pair of differential pitch diameter idler gears that establish a driving connection between a turbine driven drive gear located on the converter axis and a driven gear located on the output shaft axis. The differential pitch diameter idler gears establish a transfer drive having either one of two driving ratios between the turbine and the input element of the multiple ratio gearing. Either one or the other of the two ratios for the transfer drive may be selected by a selectively engageable friction clutch which also is located within the space corresponding to the space that normally would be occupied by the transfer drive chain of a transmission mechanism such as that of U.S. Pat. No. 4,509,389.

There are no physical constraints on the torque transfer gear ratio established by the differential pitch diameter gearing. This is in contrast to the design approach of the Ward's article, previously mentioned, where a simple planetary gear unit and clutch assembly are used at the output end of the multiple ratio gearing. Thus, the transaxle of my invention may be adapted with minor modifications in the pitch diameter ratios of the torque transfer drive to obtain optimum engine fuel economy and optimum performance and gradeability for the vehicle driveline. This will be explained particularly in the following paragraphs.

Transaxle and Engine Matching

Appropriate matching of the engine and transaxle as described above is made possible by using five or more forward driving ratios for a wider range of a variable hereinafter referred to as N/V, which equals engine speed divided by vehicle speed. An optimum N/V for any engine and transaxle assembly will result in optimum gradeability, city and highway fuel economy and performance. As the N/V increases, the gradeability at 65 m.p.h., in a typical example, would increase. There is a direct relationship between 65 m.p.h. gradeability and top gear N/V ratio. The acceleration characteristics, measured as time required for acceleration from 0–60 m.p.h., increases with an increase in the N/V ratio.

Engine efficiency varies with average engine speed, and the variation is an inverse variation. It is possible by changing the N/V ratio to modify the upshifts and the lockup clutch point for the torque converter so that the engine operates always as close as possible to the optimum efficiency point. During city driving the shift schedule and the lockup strategy compensate for a change in N/V. Thus, the average engine speed change is less than the N/V variation. With an increase in N/V, however, the average engine speed increases as average torque decreases, leading to a higher brake specific fuel consumption point and a lower engine efficiency during city driving. On the other hand, transaxle efficiency, as distinct from engine efficiency, varies with the amount of time over the operating cycle during which the converter is locked. Thus transaxle efficiency during city driving improves with an increasing N/V. It is possible in this instance to lockup the converter at a lower engine speed without exceeding the engine lugging limit. Thus, a higher percentage of the operating cycle time is spent with the converter locked.

By tailoring the pitch diameters of the torque transfer gears it is possible to achieve two counteracting efficiency effects during city driving. Upon an increasing N/V, engine efficiency decreases due to a higher operating speed at lower loading, but transaxle efficiency increases due to a greater percentage of the operating time that the converter is locked. Thus, the overall powertrain efficiency stays relatively constant with N/V changes.

During operation in the so-called highway cycle when the vehicle is travelling at approximately 50 m.p.h., the average engine speed over the cycle is approximated by the engine speed at 50 m.p.h. in top gear with the converter locked. The variation in both transmission and engine efficiency as N/V changes corresponds inversely to the change in the average engine speed, which in turn corresponds to top gear N/V. As top gear N/V increases, both engine and transaxle efficiency decrease due to the higher engine speed and the more lightly loaded operation. Thus, highway fuel economy is generally inversely related to top gear N/V.

Variations in the pitch diameters of the torque transfer gear to accomplish N/V changes can be made to result in an improvement in the fuel economy, but that is done at the expense of top gear gradeability.

I contemplate that my invention is capable of establishing a pattern of downshift ratios on downshifts from a given ratio that differ from the ratios that were established for sequential upshifts during a vehicle acceleration driving mode. For example, if the transaxle is downshifted from the fourth ratio following vehicle acceleration in the vehicle acceleration driving mode, the downshift ratio may be a ratio value other than the third ratio that was in effect just prior to the upshift to the fourth ratio. This design choice in the control strategy is available by reason of the ratio splitting effect that is made available by the dual range features of the torque transfer drive.

Torque Transfer Drive

My invention makes it possible to take into account these design considerations and to match the engine and transaxle by appropriately choosing the final drive pitch diameters as described above in matching the engine with the transaxle. This would not be possible with a simple planetary auxiliary gear unit used in series relationship with respect to a base four speed ratio transmission.

The torque transfer drive of my invention is a simple two speed gear system comprising five gears, one being connected to the turbine in meshing with one of two idlers. The two idlers in turn mesh with two more gears mounted on the axle mounted transmission input shaft, one being driveably connected to the input shaft through a one way clutch and the other being connected to the input shaft through a controlled, selectively engageable friction clutch. It is possible to shift ratio in the transfer drive independently of the main four speed transmission, thus providing up to eight speed ratios although useful automatic upshifting may involve as few as only five of the eight ratios.

BRIEF DESCRIPTION OF THE FIGURES OF THE DRAWING

FIG. 8 is chart showing the clutch and brake engagement and release pattern for the embodiment of FIG. 7.

PARTICULAR DESCRIPTION OF THE INVENTION

Figure 3:
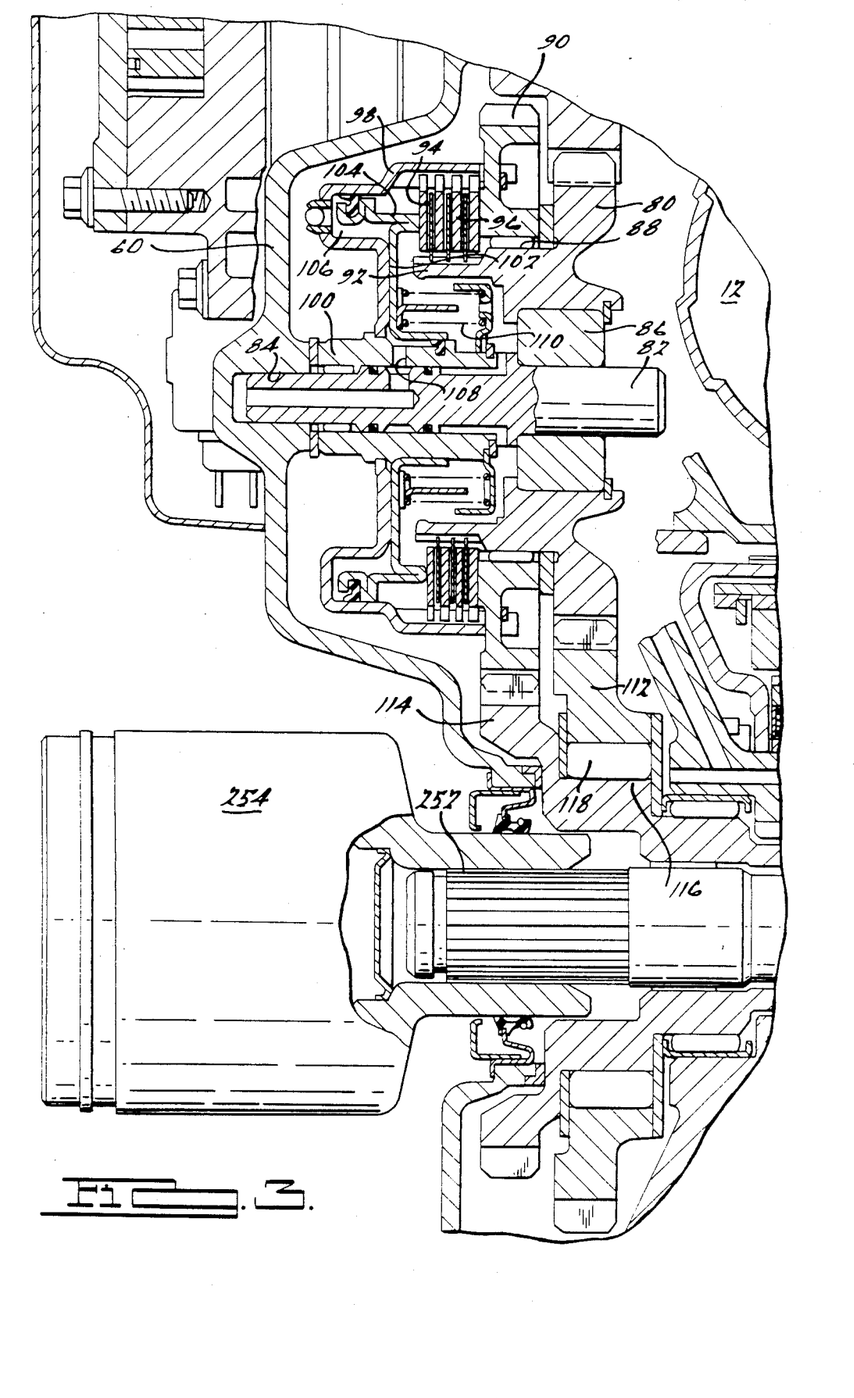
FIG. 3 is a partial cross-sectional view showing in detail the elements of a dual range torque transfer drive.
Figure 4:
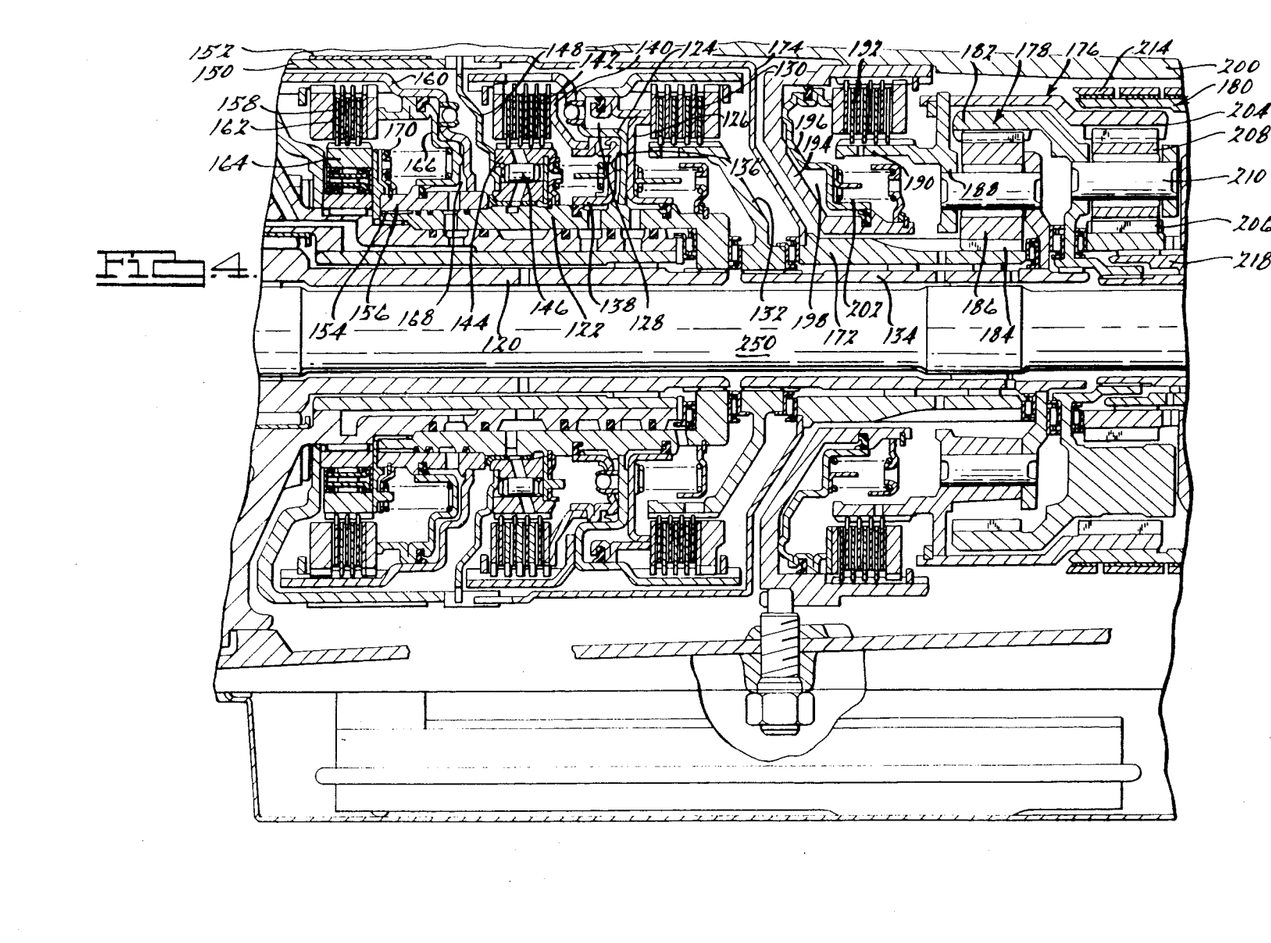
FIG. 4 is a partial cross-sectional view showing multiple ratio planetary gearing arranged on the axis of the torque output shaft.
Figure 5:
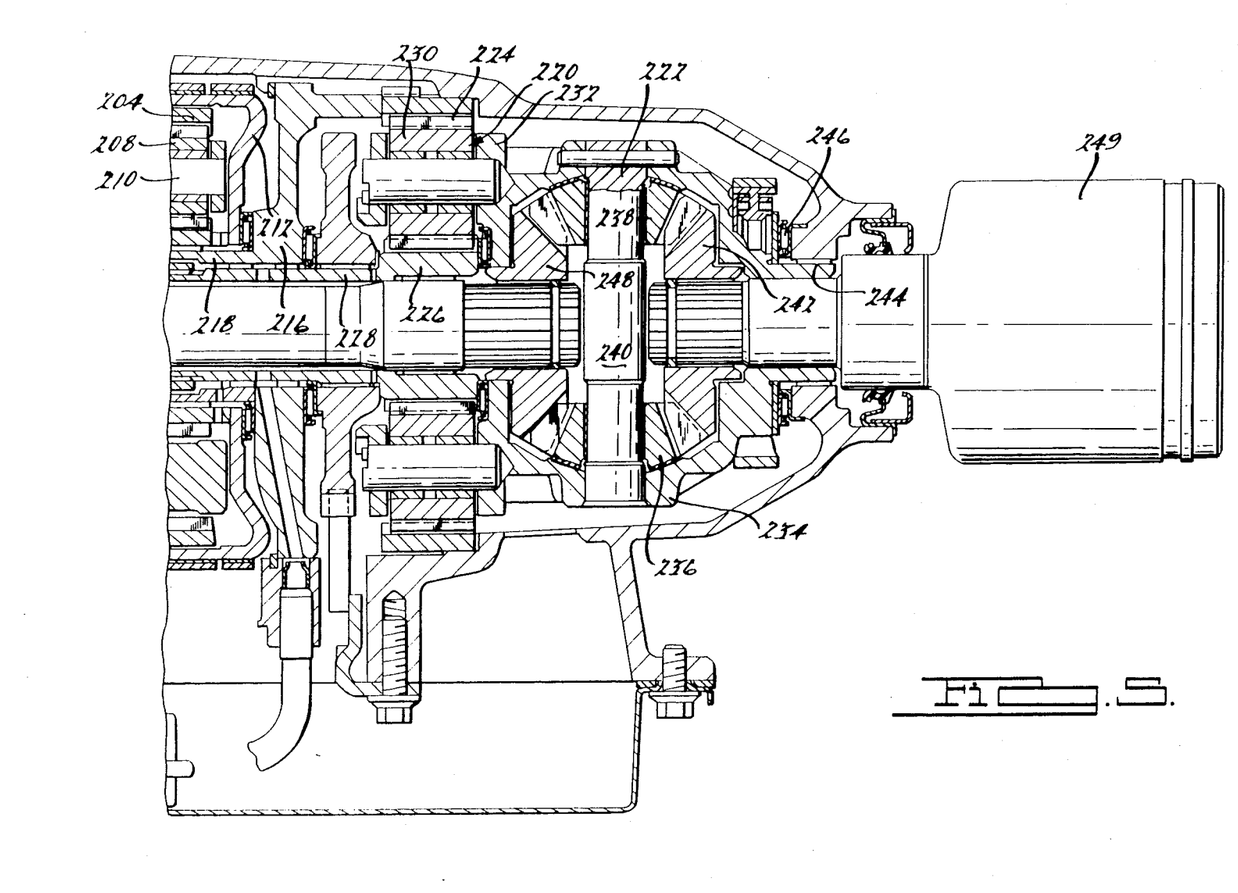
FIG. 5 is a partial cross-sectional view showing the construction of the final drive gear assembly.

The transaxle of my invention comprises five principal sub-assemblies. The first sub-assembly is the torque converter assembly shown in FIG. 2, which includes an impeller connected driveably to an engine crankshaft, not shown. The second sub-assembly comprises dual ratio torque transfer gearing for connecting a turbine to the torque input elements of the multiple ratio gearing. The dual ratio torque transfer gearing is shown in FIG. 3. The third sub-assembly comprises the clutch and brake arrangement of FIG. 4, which is used to control the ratio changes of the gearing. A fourth sub-assembly comprises two simple planetary gear units as seen in FIG. 4. These are controlled by the clutch and brake system of FIG. 4 to establish four ratios in the forward driving mode and a single reverse ratio. The fifth sub-assembly comprises final drive gearing located at the torque output end of the two simple planetary gear units. This is seen in FIG. 5.

The Torque Converter

Figure 2:
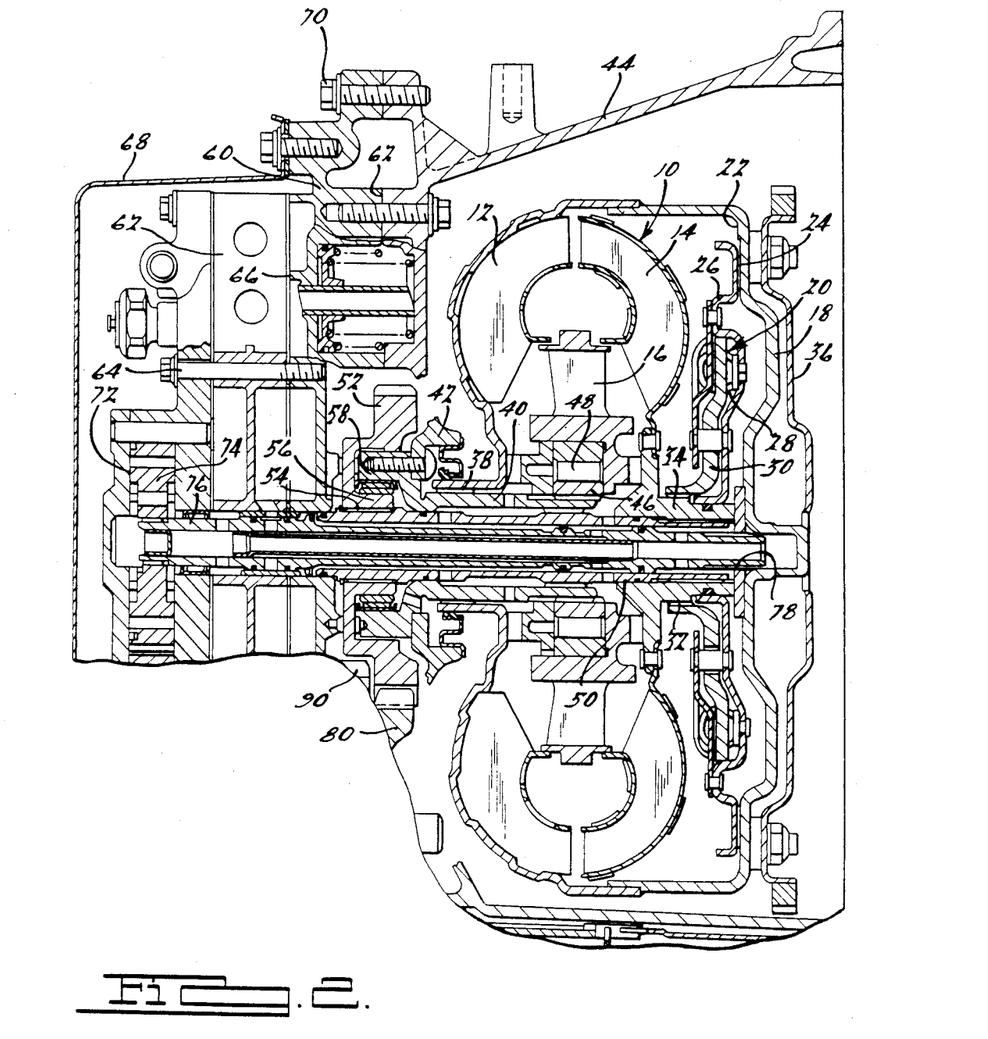
FIG. 2 is a partial cross-sectional view of a preferred embodiment of my invention including a hydrokinetic torque converter and the torque input gear of a dual range torque transfer drive.

In FIG. 2 the torque converter is indicated generally by reference character 10. It includes a bladed impeller 12, a bladed turbine 14 and a bladed stator 16. These torque converter elements are arranged in toroidal fluid flow relationship in the usual fashion. The impeller accommodates radial outflow and the turbine is characterized by radial inflow of the fluid of the torus circuit. A bladed stator located between the flow exit section of the turbine and the flow entrance section of the impeller functions in the usual fashion to change the tangential direction of the fluid flow velocity vector at the exit of the turbine before the fluid is allowed to enter the entrance region of the impeller.

The impeller comprises an impeller housing 18 which encloses the turbine 14 as well as a torque converter lockup clutch assembly 20. The impeller housing is formed with a friction clutch surface 22 that is adapted to be engaged by an annular clutch surface 24 of lockup clutch plate 26. That plate is connected by means of a resilient damper spring assembly 28 to damper 30, the latter being splined at 32 to turbine hub 34 for the turbine 14.

The right hand face of the impeller housing 18 is bolted as shown to a starter ring gear and drive plate assembly 36, the latter being connected to the crankshaft of an internal combustion engine, not shown.

The impeller 12 is journaled at 38 on impeller sleeve shaft support 40, which is secured to a bearing support wall 42 which forms a part of the transaxle housing portion 44 of the torque converter.

The inner race 46 of overrunning coupling 48 is splined to the sleeve shaft 40. Overrunning coupling 48 is disposed in the hub of stator 16 and is adapted to distribute a hydrokinetic torque reaction to the stationary sleeve shaft 40 during operation of the converter in the torque multiplication mode.

Turbine sleeve shaft 50 is splined to the turbine hub 34. It extends through and is supported by the stationary sleeve shaft 40.

Torque transfer drive gear 52 is splined at 54 to the sleeve shaft 50. The hub 56 of gear 52 is journaled on annular bearing support 58, which forms a part of the stationary sleeve shaft 40.

The gear 52 is located in a space defined by housing portion 60, which is secured to the machined face 62 on the left side of the housing portion 44. A control valve body in the form of a casting 62 is secured by bolts 64 to the left hand surface 66 of the housing portion 60. Valve body cover 68 encloses the valve body 62 and is secured to the machined surface 66 by bolts 70.

Located in the valve body cover 68 is a pump housing 72 containing positive displacement pump elements 74, which are connected driveably to pump drive shaft 76, the latter extending axially through turbine sleeve shaft 50. The right hand end of the shaft 76 is splined at 78 to the central hub portion of the converter housing 18.

Torque transfer drive gear 52 meshes with a first idler gear 80 mounted on support shaft 82, the latter being received in shaft opening 84 formed in housing portion 60. The other end of shaft 82 is supported by a support wall, not shown, which is part of the transaxle housing. Idler gear 80 is supported on shaft 82 by bearing 86. Idler gear 80 includes a bearing shoulder 88 on which is journaled a second idler gear 90. A clutch drum 92 formed on idler gear 80 carries internally splined clutch discs 94, which register with externally splined clutch discs and separator plates 96. Plates 96 are splined to the inner periphery of annular cylinder member 98.

Cylinder member 98 secured to cylinder hub 100 defines with the hub an annular chamber 102 in which is received clutch piston 104. The radially outward margin and the radially inward margin of the piston 104 are provided with seals to effect a working pressure chamber 106 which is in fluid communication with clutch supply pressure port 108 in the hub 100. That port communicates with internal passages in the support shaft 82, which communicate with the control valve body.

Clutch piston return spring 110, which is anchored on the cylinder hub 100 by a spring retainer as shown, urges piston 104 in a left hand direction to effect disengagement of the clutch discs 94 and 96 thereby releasing the clutching connection between the idler gears 80 and 90. The pitch diameter of idler 90 is greater than the pitch diameter of idler 80. Idler 80 meshes with driven gear 112 and idler 90 meshes with driven gear 114. The pitch diameter of gear 112 is greater than the pitch diameter of gear 114.

The Clutches and Brakes

Gear 112 is supported on a shoulder 116 of gear 114 and overrunning clutch 118 is interposed between the hub 116 and the gear 112 to provide a one way torque delivery path between the gear 118 and torque delivery sleeve shaft 120, the latter being connected to or formed integral with gear 114. Sleeve shaft 120 is splined to clutch sleeve 122 which is connected to clutch cylinder 124. Cylinder member 124 receives annular piston 126, which cooperates with the cylinder to define a clutch pressure chamber 128 which is in communication with supply passages formed in the internal sleeve shaft arrangement. Although the disc clutch assembly 130 has clutch discs carried respectively by clutch element 132 and the inner periphery of the clutch cylinder 124 when the working chamber 128 is pressurized, the piston 126 causes the friction clutch 130 to be energized thereby establishing a mechanical connection between clutch element 122 and clutch element 132, the latter being splined to torque delivery sleeve shaft 134.

Cylinder member 124 defines also an annular cylinder 136 in which is positioned annular piston 138. A pressure plate 140 carried by the piston 138 is adapted to engage multiple disc clutch assembly 142 which comprises externally splined clutch discs secured to the inner periphery of cylinder member 124 and internally splined clutch discs secured to the outer race 144 of overrunning coupling 146. The inner race of the overrunning coupling 146 is connected by torque transfer member 148 to brake drum 150.

The brake band 152 is engaged during overdrive operation to effect a reaction point at the forward sun gear which will be described subsequently.

Clutch sleeve shaft 122 is splined at 154 to cylinder hub 156 for a forward clutch identified generally by reference numeral 158. The forward clutch includes also a cylinder member 160 secured to the hub 156. It includes also externally splined clutch discs 162 carried by internal splines on the cylinder member 160. Internally splined clutch discs for the forward clutch 158 are carried by the overrunning clutch 164, the inner race of which is connected directly to the hub of brake drum 150.

Cylinder member 160 receives an annular piston 166 and cooperates with the piston 166 to define a clutch pressure chamber 168 that communicates with internal passages formed in the sleeve shaft arrangement. When the pressure chamber 168 is pressurized, piston 166 establishes a frictional, direct drive connection between sleeve shaft 120 and the outer race 144 for the overrunning coupling 146.

A series of piston return springs 170 effects disengagement of the forward clutch 158 when the pressure chamber 168 is depressurized.

Brake drum 150 is connected directly to sun gear sleeve shaft 172 through torque transfer drum 174, which extends over the direct clutch shown in part at 142 and the intermediate clutch shown in part at 130.

Planetary Gear Arrangement

The planetary gear system that establishes four forward driving ratios is identified generally by reference character 176. It includes a first planetary gear unit 178 and a second planetary gear unit 180. Gear unit 178 comprises ring gear 182 sun gear 184 and planet pinions 186 journaled on carrier 188. Pinions 186 engage driveably ring gear 182 and sun gear 184. Carrier 188 is connected to externally splined brake element 190 for the reverse multiple disc brake assembly 192, sometimes referred a reverse clutch by persons skilled in the art.

Reverse brake assembly 192 includes a cylinder member 194 which cooperates with an annular piston 196 to define a pressure chamber 198 which, when pressurized, establishes a frictional torque transfer path from the carrier 188 to the planetary gear housing portion 200. Cylinder member 194 is secured directly to the stationary housing portion 200. It carries externally splined discs which cooperate with internally splined discs that are carried by the carrier element 190. Return springs 202 return the annular piston 196 to an inoperative position when pressure in chamber 198 is relieved.

Planetary gear unit 180 comprises ring gear 204, sun gear 206, planetary pinions 208 and carrier 210, the latter journaling pinions 208 which mesh with sun gear 206 and ring gear 204. Carrier 210 is connected to the ring gear 182 of planetary gear unit 178 as shown.

Sun gear 206 is connected to the hub of low and intermediate brake drum 212. Low and intermediate brake band 214 surrounds the drum 212. Preferably the band 214 is a multiple wrap brake band that is self energizing in the braking direction so that the braking capacity during operation in low and intermediate is greater in the forward driving direction than the corresponding braking capacity during coasting operation.

Bearing support wall 216 is secured to the housing portion 200, as shown. It includes bearing support 218 which journals the brake drum 212 and the sun gear 206.

The Final Drive Gearing

A final drive planetary gear unit is shown at 220 and a final drive differential gear unit is shown at 222. Planetary gear unit 220 comprises a fixed ring gear 224, which is connected directly to the stationary bearing support wall 216. It includes also torque input sun gear 226 which is connected through sleeve shaft 228 to the carrier 210. Planetary pinions 230 journaled on carrier 232 engage ring gear 224 and sun gear 226. Carrier 232 is connected to the differential carrier 234 which encloses differential pinions 236 and 238. These pinions are supported by differential pinion shaft 240. The differential pinions 238 and 236 mesh with side gears 242 and 248. Side gear 242 is journaled in opening 244 in the housing portion 200, a suitable thrust bearing being provided at that point. Side gear 242 is splined to the torque input side of a first universal joint generally shown at 249 which accommodates a driving connection with a first half shaft for the traction wheels.

Side gear 248 is splined to centrally disposed torque output shaft 250, which extends through the planetary gear units and through the clutch and brake assembly. The opposite end of shaft 250 is splined at 252 to the torque input side of a second universal joint generally shown at 254. This accommodates a driving connection with a second half shaft for one of the traction wheels.

Mode of Operation

Figure 1:
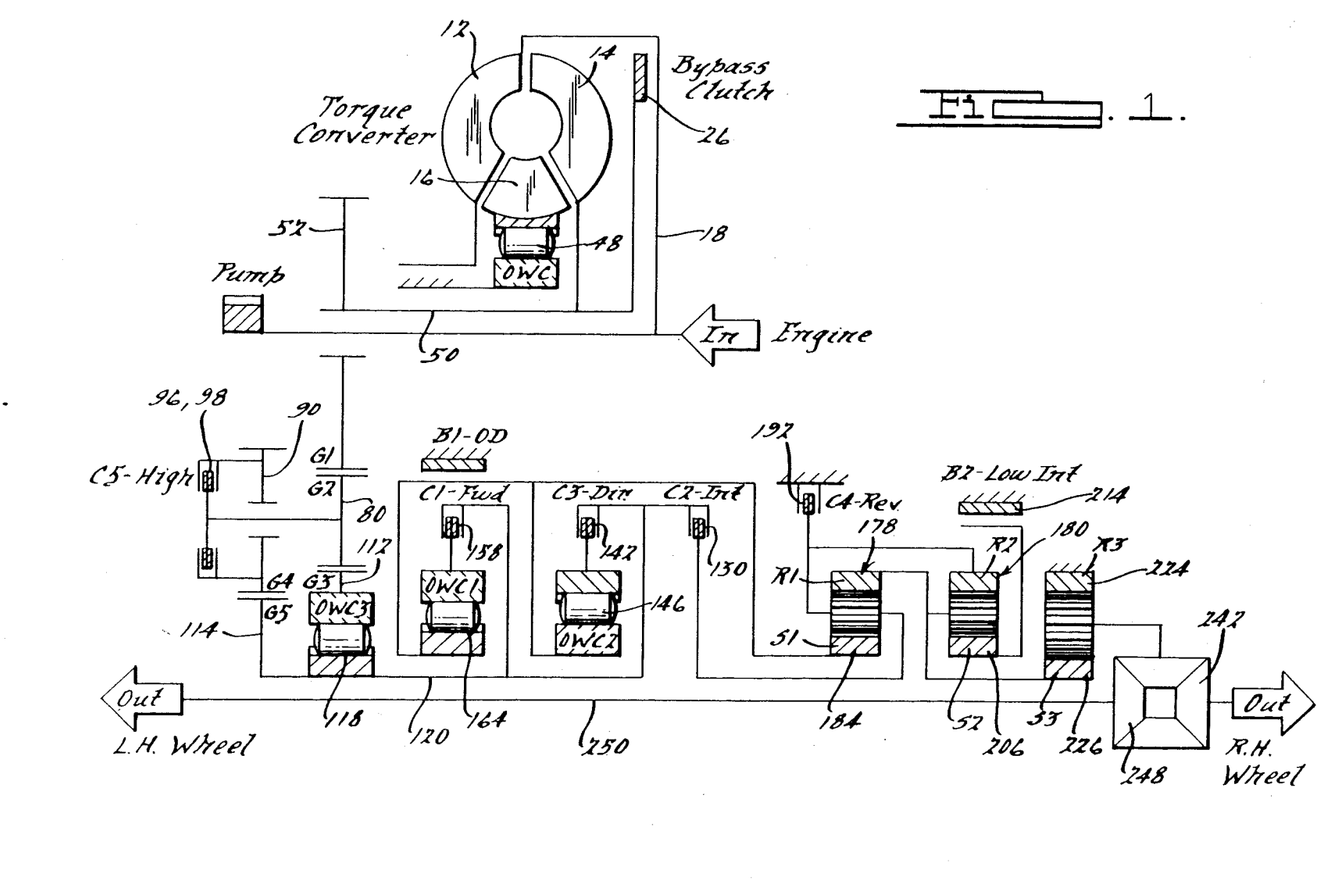
FIG. 1 shows in schematic form the improved converter and gear system of the transaxle of my invention.

The mode of operation of the transmission assembly of FIG. 2 through 5 will be described with reference to the schematic diagram of FIG. 1 corresponding to the assembly drawing of FIGS. 2 through 5. The elements that are identified by reference characters in FIG. 1 are referred to in the table of FIG. 6, which identifies the clutches and the brakes that are engaged or released during operation in each gear ratio in the drive range as well as in the reverse drive mode. The clutches and brakes of FIG. 2 have been identified in FIG. 6 by the symbols "C1", "C2", "C3", "C4", "C5", "B1" and "B2". These letter designations correspond respectively to the forward clutch shown in part in FIG. 1 at 158, the intermediate clutch shown in FIG. 1 in part at 130, the direct drive ratio clutch shown in part in FIG. 1 at 142, the reverse clutch or brake shown in part in FIG. 1 at 192 and the low and intermediate brake shown in FIG. 1 in part at 214.

Figure 6:
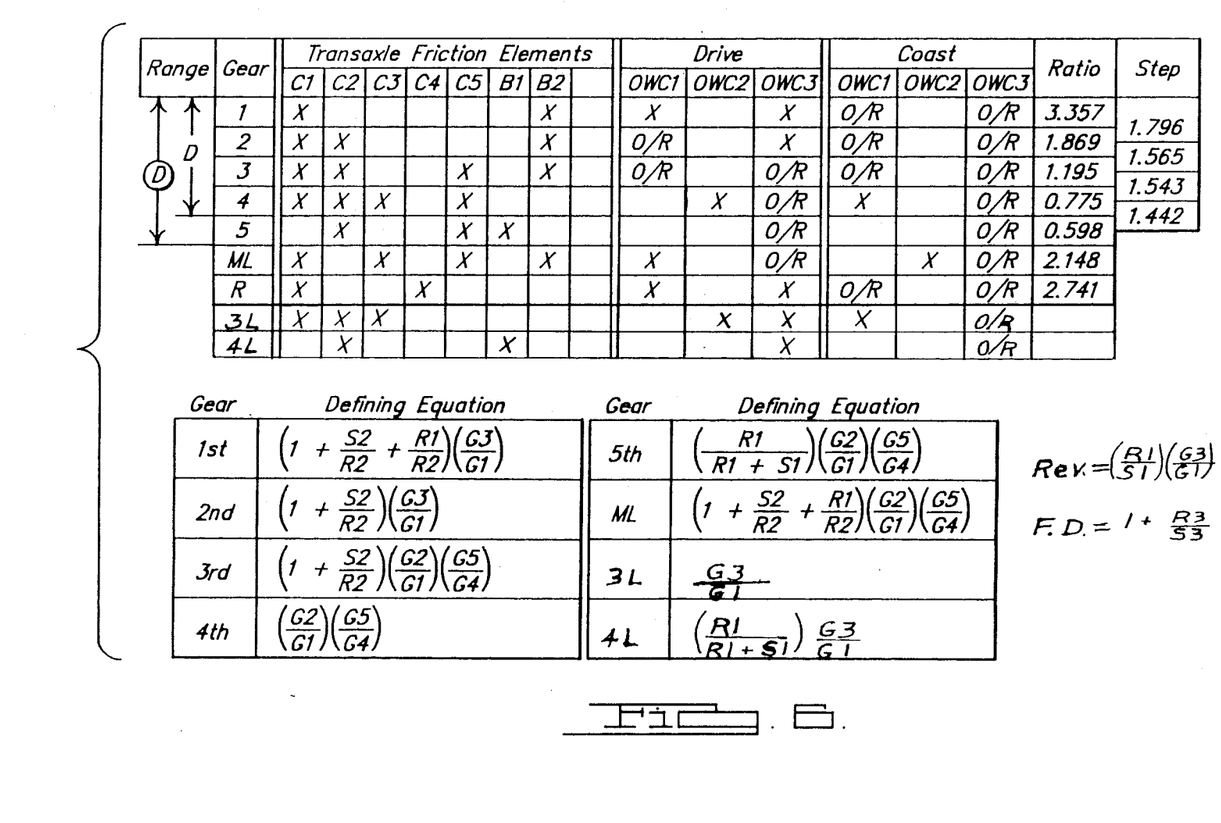
FIG. 6 is a chart showing the clutch and brake engagement and release pattern for each of four driving ratios as well as a reverse ratio for the transmission structure of FIGS. 1 through 5.

In FIG. 6 the symbol "X" indicates that the clutch or brake is activated.

FIG. 6 shows also the operating condition of the overrunning clutches OWC1, OWC2 and OWC3, which correspond respectively to overrunning clutches 164, 146 and 118. Symbol "X" in this case indicates that the overrunning coupling is transmitting torque and the symbol "O/R" indicates that it is overrunning.

FIG. 6 shows both a drive condition and a coast condition for the overrunning couplings. During operation in the lowest speed ratio, clutch C1 is applied along with brake B2. Thus the sun gear 206 acts as a reaction point as overrunning clutch C3 is adapted for torque delivery.

Turbine torque is delivered through turbine driven shaft 50 and through transfer gears 52 and 80 to the output gear 112 of the transfer drive. Torque is delivered through sleeve shafts 120 and through engaged clutch C1 and overrunning clutch OWC1 to the sun gear 184. A split torque delivery through the gear units 178 and 180 then occurs as the carrier for gear unit 178 drives the sun gear for gear unit 180. The torque for the ring gear of gear unit 178 complements the torque of the carrier of the gear unit 180. The carrier for the gear unit 180 acts as a torque output member which drives the final drive sun gear 226. Sun gear 206 acts as a reaction point during low speed ratio operation.

Second speed ratio in the forward drive range is achieved by engaging intermediate clutch C2 whereby the torque of the sleeve shaft 120 is delivered directly to the carrier for the gear unit 178 rather than to the clutch C1.

Third speed ratio is achieved by engaging clutch C5 which causes overrunning clutch OWC3 to overrun. The other clutch and brake elements for the gear units 178 and 180 remain in the same state that occurred during second speed ratio operation.

Clutch C5 remains applied during operation in the next two forward driving speed ratios; namely, the fourth ratio and the fifth ratio. To effect fourth ratio operation clutch, C3 is applied and brake B2 is released. Thus, the torque of sleeve shaft 120 is delivered through direct drive clutch C3 and overrunning clutch OWC2 to the sun gear 184 for the gear unit 178. Since clutch C1 is applied simultaneously with application of clutch C3, the elements of the gear units are locked together for rotation in unison. The only speed reduction then occurs in the torque transfer drive gear elements.

Fifth speed ratio operation is achieved by releasing clutch C1 while clutch C2 remains applied. At the same time overdrive brake B1 is applied so that the sun gear 184 acts as a reaction point as torque is delivered to the gear unit 178 through the carrier. Thus, the ring gear for unit 178 is overdriven.

In the embodiment shown, both the fourth ratio and the fifth ratio are overdrive ratios although the speed-up that is achieved for overdrive fifth ratio is a combination of the speed-up developed by the torque transfer gearing and the overdrive ratio of gear unit 178. If continuous operation in the low speed ratio range is desired, the operator may select a manual low drive mode (ML). In that case, clutch C3 is engaged along with clutch C1. Depending upon the manual low ratio that is desired, clutch C5 may be engaged or released.

Torque delivery in the reverse direction can be accommodated by clutch C3 and overrunning clutch OWC2.

In one working embodiment of the invention, the ratios are those values shown in FIG. 6 for each gear. The ratio steps or degree of change also is shown for each pair of adjacent ratios. The formulas for calculating each ratio are shown in the lower part of FIG. 6, together with a formula for the final drive.

FIG. 6 includes also gears called "3L" and "4L". These gears correspond respectively to gears 3 and 4, but the driving condition for which they are in effect requires the torque transfer drive to be in the low speed mode, i.e., the clutch C5 is released. These ratios are obtained, for example, if the shift strategy calls for separate discrete ratios for a downshift from gear 4 and from gear 3, respectively.

The ratios that are available for gears "3L" and "4", as in the case of the other gears, are shown for one particular embodiment for purposes only of illustration.

Alternate Planetary Gearing

Figure 7:
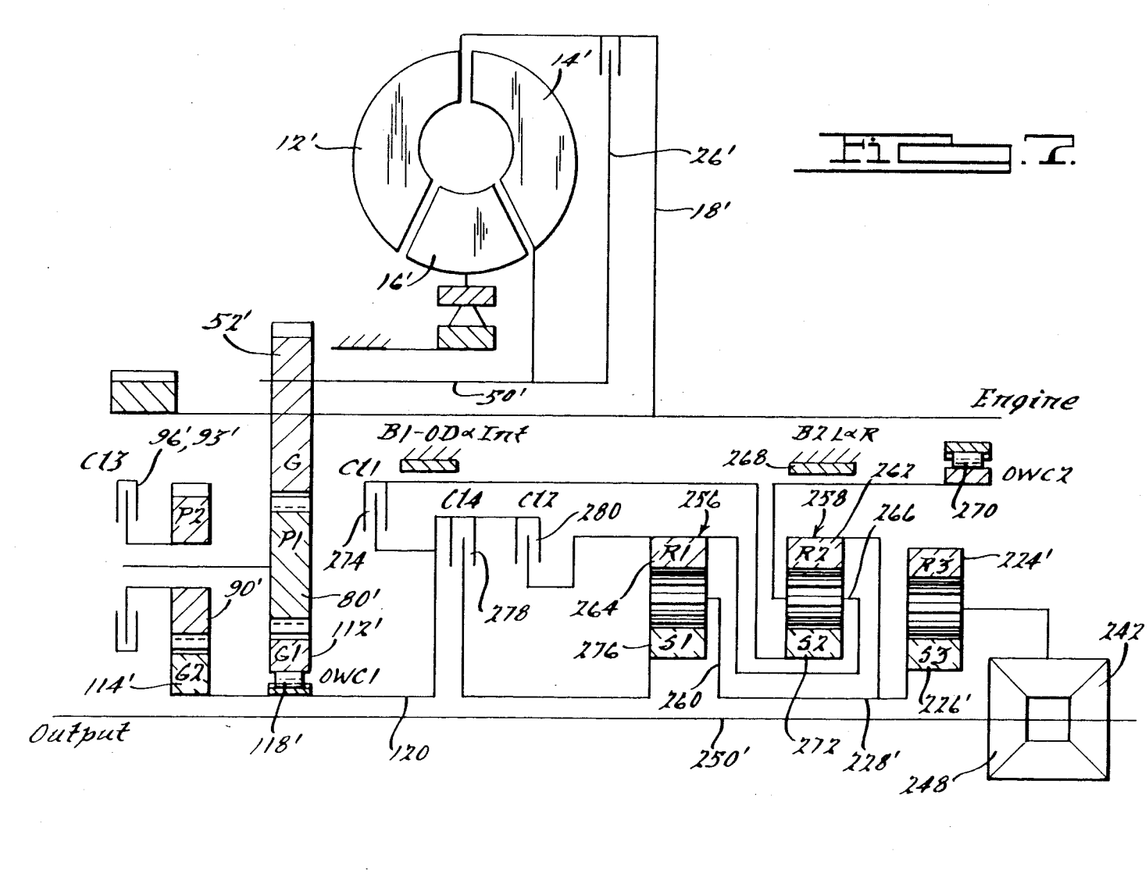
FIG. 7 is a schematic representation of an alternate embodiment of the transaxle of my invention.

In FIG. 7 I have shown a schematic arrangement of an alternate embodiment of the invention. In the embodiment of FIG. 7 several of the elements are common to the embodiment of FIG. 1. These elements are indicated by similar reference characters although prime notations are used in FIG. 7 The principal distinguishing features of FIG. 7 are the arrangements of the elements of the planetary gear units and the clutches and brakes.

In FIG. 7 two simple planetary gear units are shown at 256 nad 258. The carrier 260 for gear unit 256 is connected to output sleeve shaft 228' as is the ring gear 262 of gear unit 258.

Ring gear 264 of gear unit 256 is connected to the carrier 266 of gear unit 258, the latter in turn being braked by low and reverse brake band 268 which is engaged during low speed ratio operation in reverse. Brake band 268 is complemented by overrunning brake or clutch 270, which effects a reaction torque transfer to the transmission housing during normal forward drive operation when the transmission is operated under driving torque.

Torque input sleeve shaft 120 is adapted be connected to the sun gear 272 of gear unit 258 by reverse clutch CL1, which is identified by reference character 274. During reverse drive operation clutch CL1 is engaged so that reverse torque is delivered to the sun gear 272 thus driving the ring gear in the reverse driving direction.

Torque input sleeve shaft 120 is adapted be connected to the sun gear 276 through CL4 which is identified in FIG. 7 by reference character 278. This clutch is engaged during operation in the first, second and third forward driving ratios.

The torque input sleeve shaft 120 is adapted to be connected to a ring gear 264 of the gear unit 256 through clutch CL2 which is identified in FIG. 7 by reference character 280. Thus, torque is delivered to ring gear 264 as well as to carrier 266 during operation in the third ratio, as well as during operation in the fourth ratio.

To effect a ratio change from the third ratio to the fourth ratio it merely is necessary to apply the high range clutch CL3.

Thus, in both third ratio and fourth ratio operation the elements of planetary gear units 256 and 258 rotate in unison.

Clutch CL4 is released to effect a change to the fifth ratio as brake B1 is applied. Thus the sun gear 272 acts as a reaction point as torque is delivered to the carrier 266 thereby overspeeding the ring gear 262. The high range clutch CL3 remains applied as in the case of fourth ratio operation.

Carrier 266 acts as a reaction point during reverse drive operation as it is braked by brake band B2. Torque is delivered to the sun gear 272 through reverse clutch CL1.

As in the case of the embodiment of FIGS. 1 through 6, the transmission of FIG. 7 is capable of effecting optimum performance and economy, by tailoring the transfer drive ratios together with gradeability, to provide an effective match between the transmission and the particular internal combustion engine with which it is used. There are no dimensional restraints on the ratios of the pitch diameters of the gear elements of the transfer drive.

Figure 9:
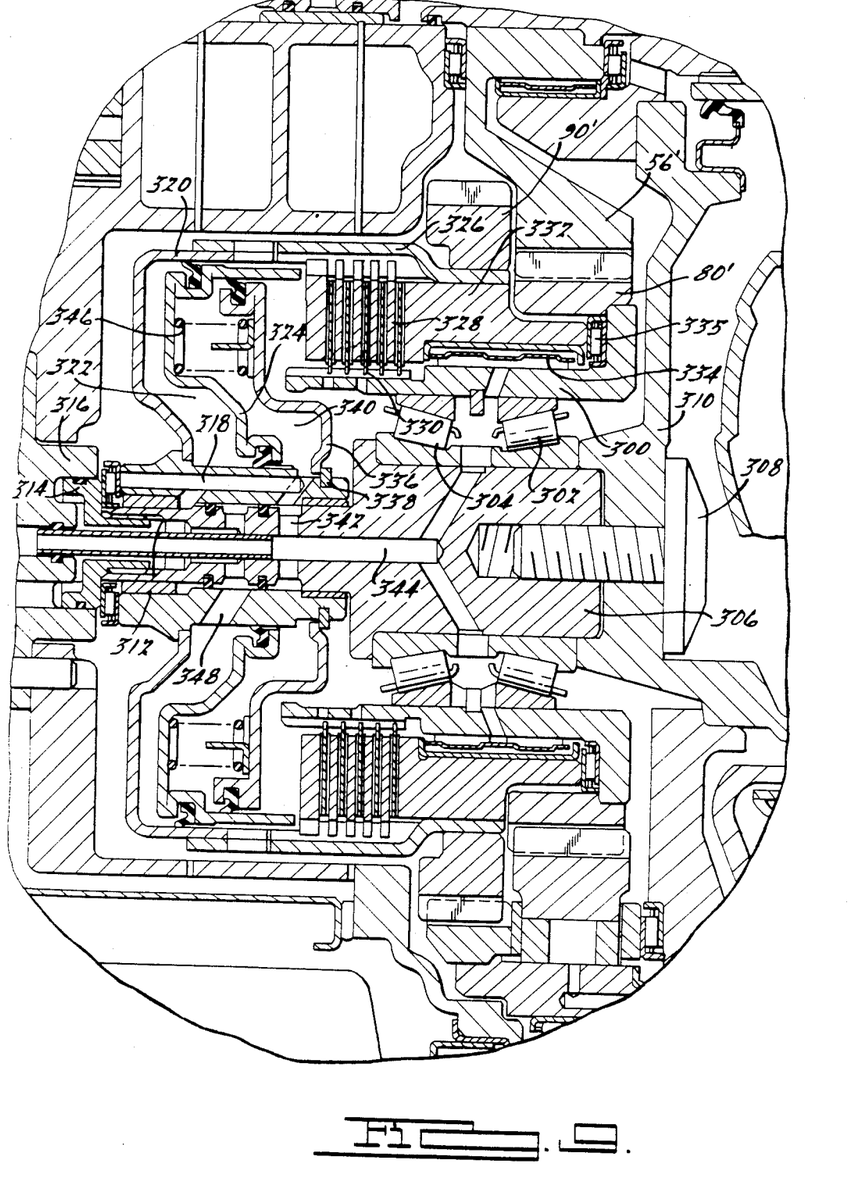
FIG. 9 is a partial cross-sectional view of the fluid pressure operated servo for activating and deactivating the double ratio geared, transfer drive of an alternate embodiment of my invention.
Figure 11:
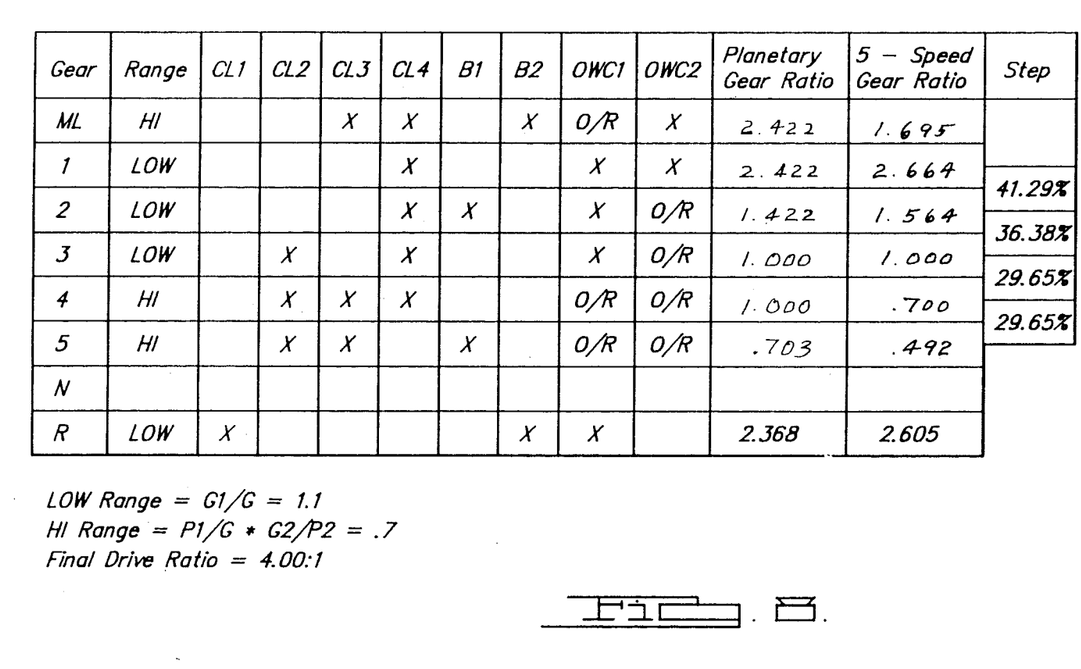

Alternate Embodiment of FIG. 9

FIG. 9 shows an alternate embodiment for the clutch means for activating and deactivating the differential pitch diameter torque transfer gears. This embodiment of FIG. 9 comprises a small diameter transfer gear 80', corresponding to transfer gear 80 described previously, and a large diameter transfer gear 90' corresponding to transfer gear 90 described previously. Drive gear 56' corresponds to gear 56 described previously. It engages gear 80' which is secured to sleeve shaft 300 which in turn is supported by tapered roller thrust bearings 302 and 304 supported by clutch support stub shaft 306. One end of shaft 306 is secured by threaded element 308 to support wall 310 of the housing. The opposite end of support shaft 306 is formed with a reduced diameter. Its end is open, as shown at 312, to receive adapter for providing a second bearing support on housing portion 316.

A clutch hub 318 is journaled on the reduced diameter portion of support stub shaft 306. An annular cylinder in a form of a stamping 320 is carried by the hub 318. It defines a working pressure chamber 322. The chamber 322 is defined in part by an annular piston 324 received in the cylinder 320.

Gear 90' is secured to a drum 326 which is secured fast to cylinder 320. It is formed with internal splines that register with external splines on clutch discs 328. Internal splines on companion clutch discs 330 register with external splines on the sleeve shaft 300. A clutch pressure reaction ring 332 is secured to the drum 326 and is journaled by bearing 334 on the sleeve shaft 300. Axial forces created by the clutch actuating pressure are accommodated by thrust bearing 334.

A centrifugal pressure reaction plate 336 is secured to cylinder hub 318 and is held axially fast by snap ring 332. Plate 336 and the annular piston 324 define a centrifugal pressure chamber 340, which communicates with a lube pressure port 342, the latter in turn communicating with lube passages shown in part at 344 in the support 306.

A plurality of compression springs 346 is interposed between piston 324 and plate 336 to normally disengage the clutch. When the pressure chamber 322 is depressurized, actuating pressure is delivered to working chamber 322 through feed passages defined in part by pressure port 348.

The inner and outer margins of the annular piston 322 and the outer margin of the plate located within the piston carry seals to allow a controlled pressure buildup across the piston 322.

Having described preferred embodiments of my invention, what I claim and desire to secure by U.S. letters patent is:

1. A transaxle assembly having a hydrokinetic unit with a turbine and an impeller located on a first axis, a multiple ratio planetary gear assembly located on a second axis, said axes being in spaced relationship:
   a multiple ratio torque transfer drive having external gears of different pitch diameters mounted on a third axis intermediate said first and second axes, said transfer drive including;
   a drive gear connected to said turbine and in engagement with one of said external gears;
   driven gear means connected to the other of external gears, and selectively engageable clutch means for establishing and disestablishing each of two torque flow paths whereby the ratios that are established by said planetary gear assembly are complemented by the ratios of said external gears.

2. A transaxle assembly for delivering driving torque from an engine crankshaft to traction wheels of a vehicle comprising:
   a hydrokinetic unit with a turbine and an impeller disposed on a first axis, said crankshaft having an axis coincident with said first axis;
   multiple ratio gearing disposed on a second axis, said first axis being spaced from said second axis;
   multiple ratio torque transfer gearing comprising two torque transmitting gear elements mounted on a third axis disposed between said first and second axes;
   a transaxle housing enclosing said multiple ratio gearing and said hydrokinetic unit and defining a space therein between said first and second axes, said transfer gearing being disposed in said space;
   said gear elements having differential pitch diameters and defining plural torque flow paths between said first and second axes; and
   selectively engageable clutch means for activating and deactivating each gear element whereby the effective overall transaxle speed ratios are a product of the ratios established for said torque flow paths and said multiple ratio gearing.

3. In an automotive vehicle driveline having an internal combustion engine with a crankshaft having its axis disposed transversely with respect to the vehicle fore-and-aft geometric plane and forwardly disposed traction wheels;
   a transaxle comprising a hydrokinetic torque converter mounted on the axis of said crankshaft, multiple ratio gearing mounted on a second axis, and final drive gearing;
   a driven shaft, means for driveably connecting said driven shaft to each of said traction wheels, said driven shaft being disposed coaxially with respect to said multiple ratio gearing;
   friction clutch and brake means concentrically disposed with respect to said driven shaft;
   torque transfer gearing means for transferring driving torque from said hydrokinetic torque converter to the torque input side of said clutch and brake means including differential pitch diameter gears defining plural torque flow paths; and
   torque transfer clutch means for activating and deactivating said torque flow paths whereby the overall transaxle torque ratios may be matched to the speed and torque characteristics of said engine to obtain optimum overall fuel economy, performance and gradeability.

4. The combination as set forth in claim 1 wherein said planetary gear assembly includes a torque input shaft, said external gears being connected driveably to each of two driven gears of said transfer drive, overrunning clutch means for connecting one external gear to its associated driven gears.

5. The combination as set forth in claim 4 wherein said transfer drive includes a driving gear on said first axis connected to said turbine, one of said external gears being connected driveably to said driving gear.

6. The combination as set forth in claim 1 wherein said selectively engageable clutch means comprises a torque input element connected to one external gear and a torque output element connected to the other external gear, one torque flow path being defined by said driven gear means including an overrunning clutch adapted to overrun when said selectively engageable clutch means is activated.

7. The combination as set forth in claim 2 wherein said selectively engageable clutch means comprises a torque input element connected to one torque transmitting gear element and a torque output element connected to the other torque transmitting gear element, and an overrunning clutch defining one of a plurality of torque flow paths through said torque transfer gearing; said overrunning clutch being adapted to overrun when said selectively engageable clutch means is activated.

8. The combination as set forth in claim 3 wherein said torque transfer gearing means establishes plural torque flow paths between said first and second axes, an overrunning clutch disposed in and partly defining one of said torque flow paths, said overrunning clutch being adapted to overrun when said torque transfer clutch means is activated.

9. The combination as set forth in claim 1 wherein said selectively engageable clutch means includes an annular clutch disc assembly having torque input discs connected driveably to one of said external gears and torque output discs connected to the other of said external gears;

an annular servo piston and an annular servo cylinder receiving said annular piston;

said piston and cylinder defining an annular fluid pressure working chamber on one side of said piston;

passage means for distributing working pressure to said working chamber, means for forming a centrifugal pressure chamber on the other side of said piston; and a lubrication fluid passage means communicating with said centrifugal pressure chamber whereby centrifugal pressure forces acting on said piston are substantially balanced.

10. The combination as set forth in claim 2 wherein said selectively engageable clutch means includes an annular clutch disc assembly having torque input discs connected driveably to one of said external gears and torque output discs connected to the other of said external gears;

an annular servo piston and an annular servo cylinder receiving said annular piston;

said piston and cylinder defining an annular fluid pressure working chamber on one side of said piston;

passage means for distributing working pressure to said working chamber, means for forming a centrifugal pressure chamber on the other side of said piston; and a lubrication fluid passage means communicating with said centrifugal pressure chamber whereby centrifugal pressure forces acting on said piston are substantially balanced.

* * * * *